US010783567B2

(12) United States Patent
Smoot et al.

(10) Patent No.: US 10,783,567 B2
(45) Date of Patent: Sep. 22, 2020

(54) RETAIL VENUE PROVIDING AUTOMATED CUSTOMER ASSISTANCE

(71) Applicant: Disney Enterprises, Inc., Burbank, CA (US)

(72) Inventors: Lanny S. Smoot, Thousand Oaks, CA (US); Steven Makofsky, Sammamish, WA (US); Scott F. Watson, Marina Del Rey, CA (US); Nitzan Katz, Pasadena, CA (US)

(73) Assignee: Disney Enterprises Inc., Burbank, CA (US)

( * ) Notice: Subject to any disclaimer, the term of this patent is extended or adjusted under 35 U.S.C. 154(b) by 562 days.

(21) Appl. No.: 15/620,572

(22) Filed: Jun. 12, 2017

(65) Prior Publication Data
US 2018/0357697 A1 Dec. 13, 2018

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0625* (2013.01); *G06Q 10/087* (2013.01); *G06Q 30/0631* (2013.01); *G06Q 30/0643* (2013.01)

(58) Field of Classification Search
CPC .................................................. G06Q 30/0625
See application file for complete search history.

(56) References Cited

U.S. PATENT DOCUMENTS

| 2015/0006320 | A1* | 1/2015 | Goulart .............. G06Q 30/0625 705/26.9 |
| 2017/0287060 | A1* | 10/2017 | Choi ....................... G06F 3/002 |
| 2018/0033045 | A1* | 2/2018 | Flynn .................... G06F 3/0488 |
| 2018/0182013 | A1* | 6/2018 | Haubold ............ G06Q 30/0625 |

OTHER PUBLICATIONS

MarketLive introduces 'omni-touch POS' to empower retail floor staff with intuitive tablet-based selling tool: [source: NoticiasFinancieras]. (Sep. 29, 2015). NoticiasFinancieras Retrieved from https://search.proquest.com/docview/1717247641?accountid=14753.*

\* cited by examiner

*Primary Examiner* — Kathleen Palavecino
(74) *Attorney, Agent, or Firm* — Farjami & Farjami LLP

(57) ABSTRACT

According to one implementation, a system for automating customer assistance includes a computing platform having a hardware processor and a memory storing a venue inventory and activity guide software code. The hardware processor is configured to execute the venue inventory and activity guide software code to receive a query from a customer of the retail venue, and determine if the query corresponds to either a retail product or an experience available at the retail venue. If the retail product or the experience is not available at the retail venue, the hardware processor executes the venue inventory and activity guide software code to generate a negative response. If the retail product or the experience is available at the retail venue, the hardware processor executes the venue inventory and activity guide software code to identify a location of the retail product or the experience, and guide the customer to the location.

18 Claims, 4 Drawing Sheets

RETAIL VENUE PROVIDING AUTOMATED CUSTOMER ASSISTANCE

BACKGROUND

The convenience and efficiency of e-commerce has had a devastating impact on traditional brick-and-mortar retail outlets, and has even come to threaten their viability as a business model. Perhaps no effort on the part of traditional retailers can enable an in-store shopping experience to compete with an online product search and purchase on the grounds of speed or ease.

If traditional retail outlets are in fact to survive and prosper, they must offer customers a shopping experience including enhancements that cannot be readily replicated in an online environment. Thus, there is a need for a commercial solution enabling a brick-and-mortar retail venue to deliver an enhanced customer experience sufficiently attractive to motivate potential shoppers to do their browsing and purchasing in-store.

SUMMARY

There are provided retail venues providing automated customer assistance, substantially as shown in and/or described in connection with at least one of the figures, and as set forth more completely in the claims.

DETAILED DESCRIPTION

Figure 1:
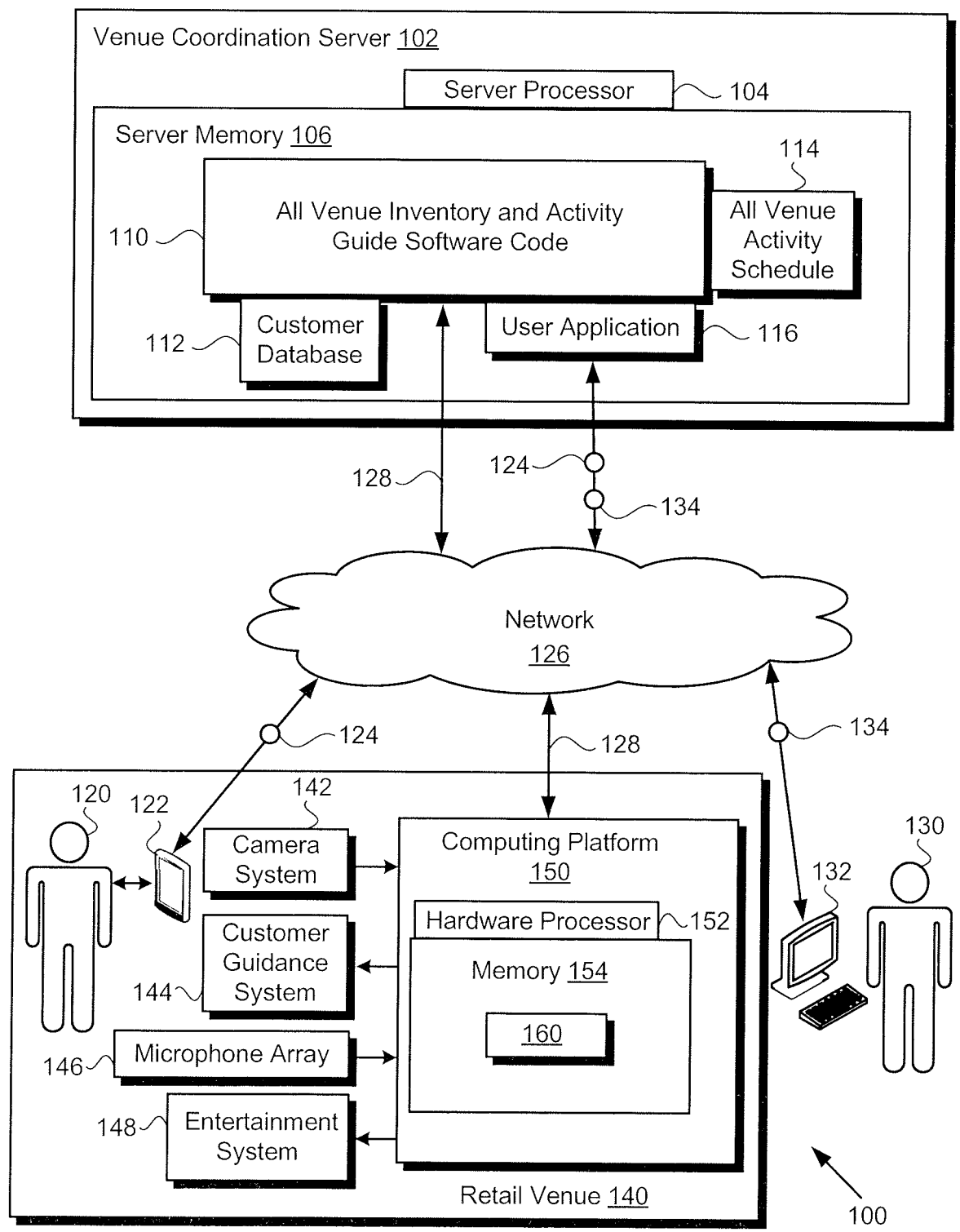
FIG. 1 shows a diagram of an exemplary system including a retail venue providing automated customer assistance, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As described above, the convenience and efficiency of e-commerce has had a devastating impact on traditional brick-and-mortar retail outlets. For example, it seems that no effort on the part of traditional retailers can enable an in-store shopping experience to compete with an online product search and purchase on the grounds of speed or ease. As further described above, if traditional retail outlets are in fact to survive and prosper, they must offer customers a shopping experience including enhancements that cannot be readily replicated in an online environment.

The present application addresses these challenges to the traditional retail model by introducing retail venues providing immersive and interactive customer environments that blend shopping with entertainment and automated customer assistance. As a result, the present application advantageously discloses brick-and-mortar retail venues designed to deliver an enhanced customer experience sufficiently attractive to motivate potential shoppers to do their browsing and purchasing in-store.

FIG. 1 shows a diagram of exemplary system 100 including retail venue 140 providing automated customer assistance, according to one implementation. As shown in FIG. 1, retail venue 140 includes computing platform 150 having hardware processor 152 and memory 154 storing venue inventory and activity guide software code 160. As further shown in FIG. 1, in some implementations, computing platform 150 may be interactively linked to one or more of camera system 142, customer guidance system 144, microphone array 146, and entertainment system 148 of retail venue 140.

According to the exemplary implementation shown in FIG. 1, system 100 is remotely linked to venue coordination server 102 over communication network 126, via network communication links 128. Venue coordination server 102 includes server processor 104, which may be a hardware processor, server memory 106, and all venue inventory and activity guide software code 110 residing in server memory 106. Also shown in FIG. 1 are customer database 112 and all venue activity schedule 114 managed by all venue inventory and activity guide software code 110, and user application 116 provided by all venue inventory and activity guide software code 110.

In addition, FIG. 1 shows customer 120 of retail venue 140, located within retail venue 140, and using mobile communication device 122 to send customer data 124 to venue coordination server 102 and/or to receive customer data 124 from venue coordination server 102. Further shown in FIG. 1 is user 130, located outside of retail venue 140, and using remote computing device 132 to send user data 134 to venue coordination server 102 and/or to receive user data 134 from venue coordination server 102.

According to the exemplary implementation shown in FIG. 1, customer 120 of retail venue 140 may interact with various assets of retail venue 140 in order to enjoy an enhanced customer experience including automated customer assistance. For example, computing platform 150 may use camera system 142 to generate an image, such as an avatar for example, corresponding to customer 120. The avatar or other image of customer 120 may be used to determine the gender of customer 120, and to estimate the age and/or physical dimensions, such as clothing size, of customer 120. That information may be transmitted to venue coordination server 102 via communication network 126, and may be stored in customer database 112 for use in generating one or more product recommendations for customer 120.

In addition customer 120 may be guided by customer guidance system 144 to products and/or experiences available to customer 120 in retail venue 140. For instance, experiences available to customer 120 within retail venue 140 may include entertainment, or participatory activities, such as games, presented to customer 120 using entertainment system 148.

In some implementations, customer 120 may further interact with assets within retail venue 140 via venue coordination server 102 and communication network 126. For example, customer 120 may download and install user application 116 on mobile communication device 122, and may utilize user application 116 to query system 100 regarding the availability of products or experiences at retail venue 140. Moreover, in some implementations, user 130 may download and install user application 116 on remote computing device 132, and may utilize user application 116 to interact with venue coordination server 102 to locate products and/or experiences available at affiliate retail venues coordinated by venue coordination server 102, of which retail venue 140 may be one of several or many.

It is noted that although FIG. 1 depicts venue coordination server 102 as a single computing platform, more generally, venue coordination server 102 may include one or more computing platforms, such as computer servers for example, which may be co-located, or may form an interactively linked but distributed system. For example, venue coordination server 102 may be implemented as a cloud based system. As a result, server processor 104 and server memory 106 may correspond to distributed processor and memory resources of such a cloud based system. It is further noted that communication network 126 may take the form of a packet-switched network, such as the Internet, for example.

Although mobile communication device 122 is depicted as a smartphone, in FIG. 1, in other implementations, mobile communication device 122 may be any mobile device usable by customer 120 to send and receive customer data 124 over communication network 126. Thus, in other implementations, mobile communication device 122 may be a tablet computer or digital media player, for example. Furthermore, although remote computing device 132 is depicted as a personal computer (PC), in FIG. 1, that representation is also provided merely by way of example. In other implementations, remote computing device 132 may take the form of any of a laptop computer, tablet computer, digital media player, gaming console, or smartphone, for example.

Figure 2:
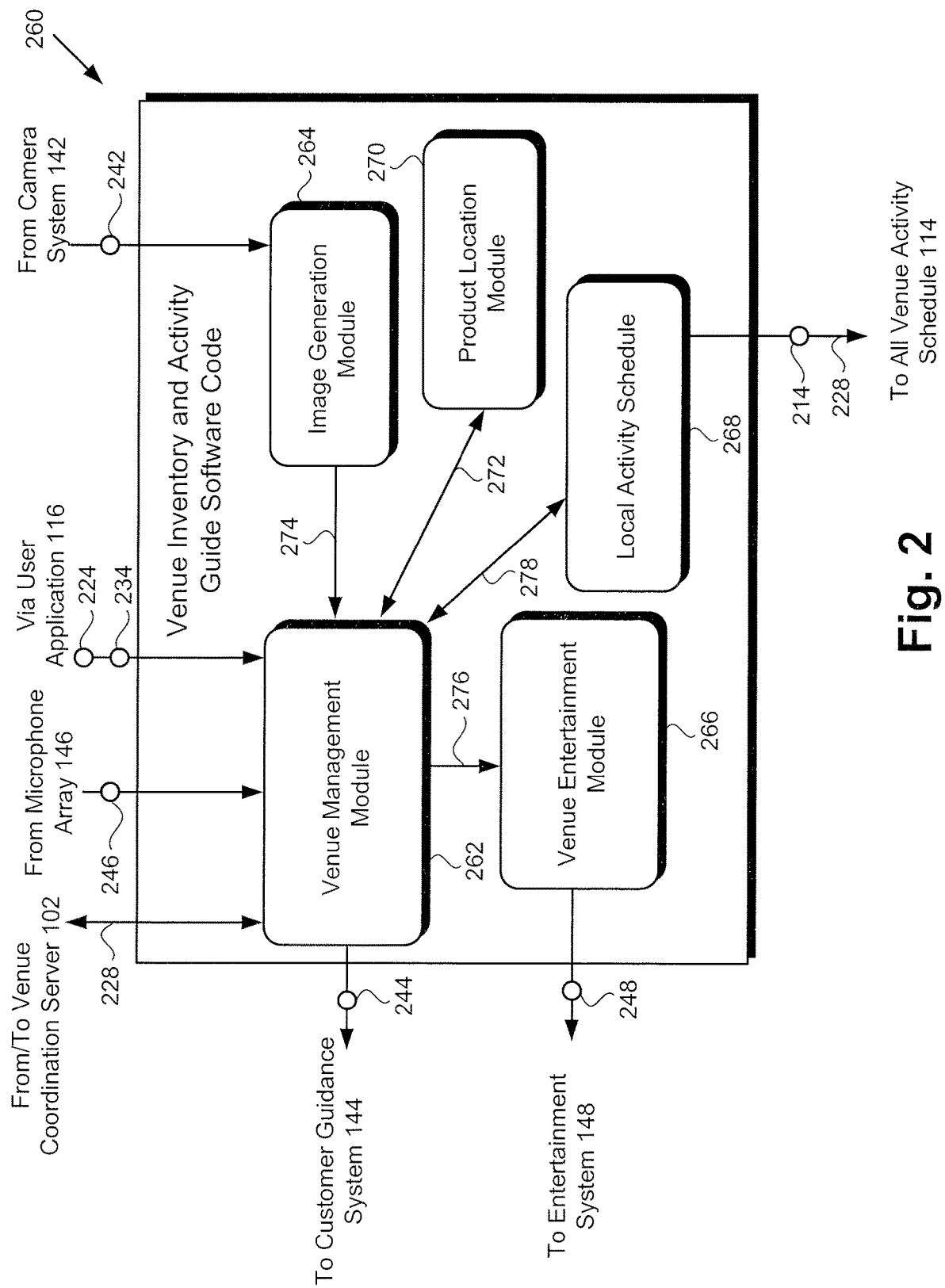
FIG. 2 shows a diagram of an exemplary venue inventory and activity guide software code suitable for use by a system including a retail venue providing automated customer assistance, according to one implementation.

FIG. 2 shows a more detailed diagram of exemplary venue inventory and activity guide software code 260 suitable for use by computing platform 150 of retail venue 140, in FIG. 1, according to one exemplary implementation. Venue inventory and activity guide software code 260 may receive camera data 242 from camera system 142, query 246 via microphone array 146, and customer data 224 and/or user data 234 via user application 116 from customer 120 and/or user 130, respectively, in FIG. 1. In addition, venue inventory and activity guide software code 260 may provide customer guidance data 244 to customer guidance system 144 and/or entertainment data 248 to entertainment system 148. Moreover, and as further shown in FIG. 2, venue inventory and activity guide software code 260 may be in communication with venue coordination server 102 via network communication links 228, and may provide local activity data 214 for inclusion in all venue activity schedule 114 on venue coordination server 102.

As shown in FIG. 2, according to the present exemplary implementation, venue inventory and activity guide software code 260 includes venue management module 262, image generation module 264, venue entertainment module 266, local activity schedule 268, and product location module 270. Also shown in FIG. 2 are customer image 274, which may be avatar 274 of customer 120, product location data 272, local activity data 278, and entertainment initiation data 276.

Customer data 224, user data 234, network communication links 228, and venue inventory and activity guide software code 260 correspond respectively in general to customer data 124, user data 134, network communication links 128 and venue inventory and activity guide software code 160, in FIG. 1, and those corresponding features may share any of the characteristics attributed to either corresponding feature by the present disclosure. Thus, although not explicitly shown in FIG. 1, like venue inventory and activity guide software code 260, in FIG. 2, venue inventory and activity guide software code 160 includes features corresponding respectively to venue management module 262, avatar generation module 264, venue entertainment module 266, local activity schedule 268, and product location module 270.

Figure 3:
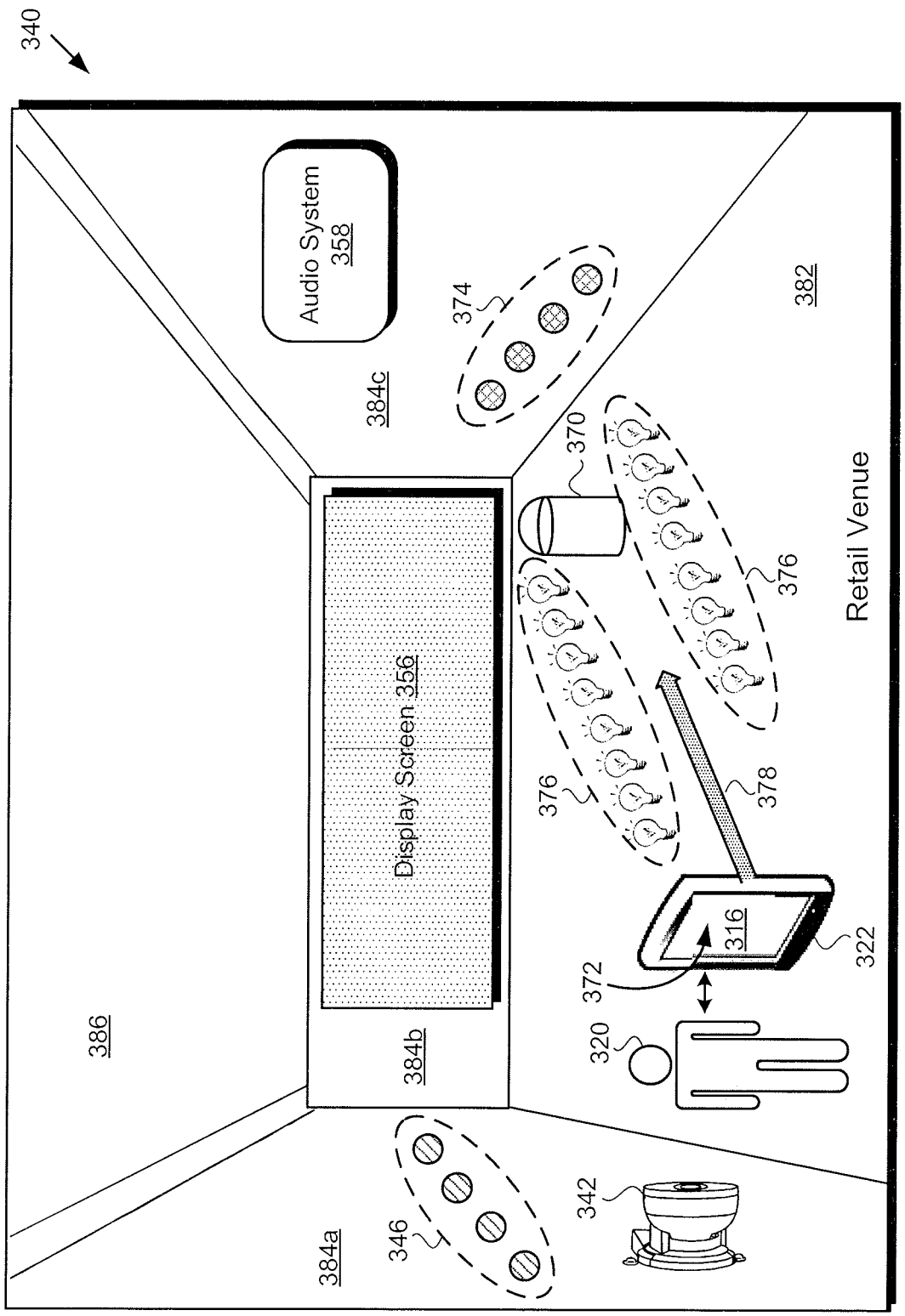
FIG. 3 shows an exemplary retail venue providing automated customer assistance, according to one implementation.

FIG. 3 shows exemplary retail venue 340 providing automated customer assistance, according to one implementation. As shown in FIG. 3, retail venue 340, which may be a brick-and-mortar store, for example, includes floor space 382, walls 384a, 384b, and 384c, and ceiling 386. In addition, retail venue 340 includes camera system 342, microphone array 346, audio speakers 374, navigation lights 376, display screen 356, and audio system 358. Also shown in FIG. 3 is customer 320 possessing mobile communication device 322 having display, user application 316 installed on mobile communication device 322, retail product 370, and optional augmented reality (AR) guidance provided to customer 320 via display 372 of mobile communication device 322 and user application 316.

Display screen 356 and audio system 358 may be elements of entertainment system 148, in FIG. 1, while speakers 374 and navigation lights 376 may be elements of customer guidance system 144. In addition, retail venue 340 corresponds in general to retail venue 140, in FIG. 1, and those corresponding features may share any of the characteristics attributed to either corresponding feature by the present disclosure. Thus, although not explicitly shown in FIG. 3, like retail venue 140, in FIG. 1, retail venue 340 includes a computing platform corresponding to computing platform 150 having hardware processor 152 and memory 156 storing venue inventory and activity guide software code 160/260. Moreover, like computing platform 150, the computing platform of retail venue 340 may be interactively linked to camera system 342, speakers 374 and/or navigation lights 376 of customer guidance system 144, microphone array 346, and display screen 356 and audio system 358 of entertainment system 148.

In addition, user application 316, in FIG. 3, corresponds in general to user application 116, in FIG. 1, and those corresponding features may share any of the characteristics attributed to either corresponding feature by the present disclosure. Moreover, customer 320 and mobile communication device 322 correspond respectively to customer 120 and mobile communication device 122, in FIG. 1. Thus, like mobile communication devices 322, mobile communication device 122 may have user application 116/316 installed thereon.

Figure 4:
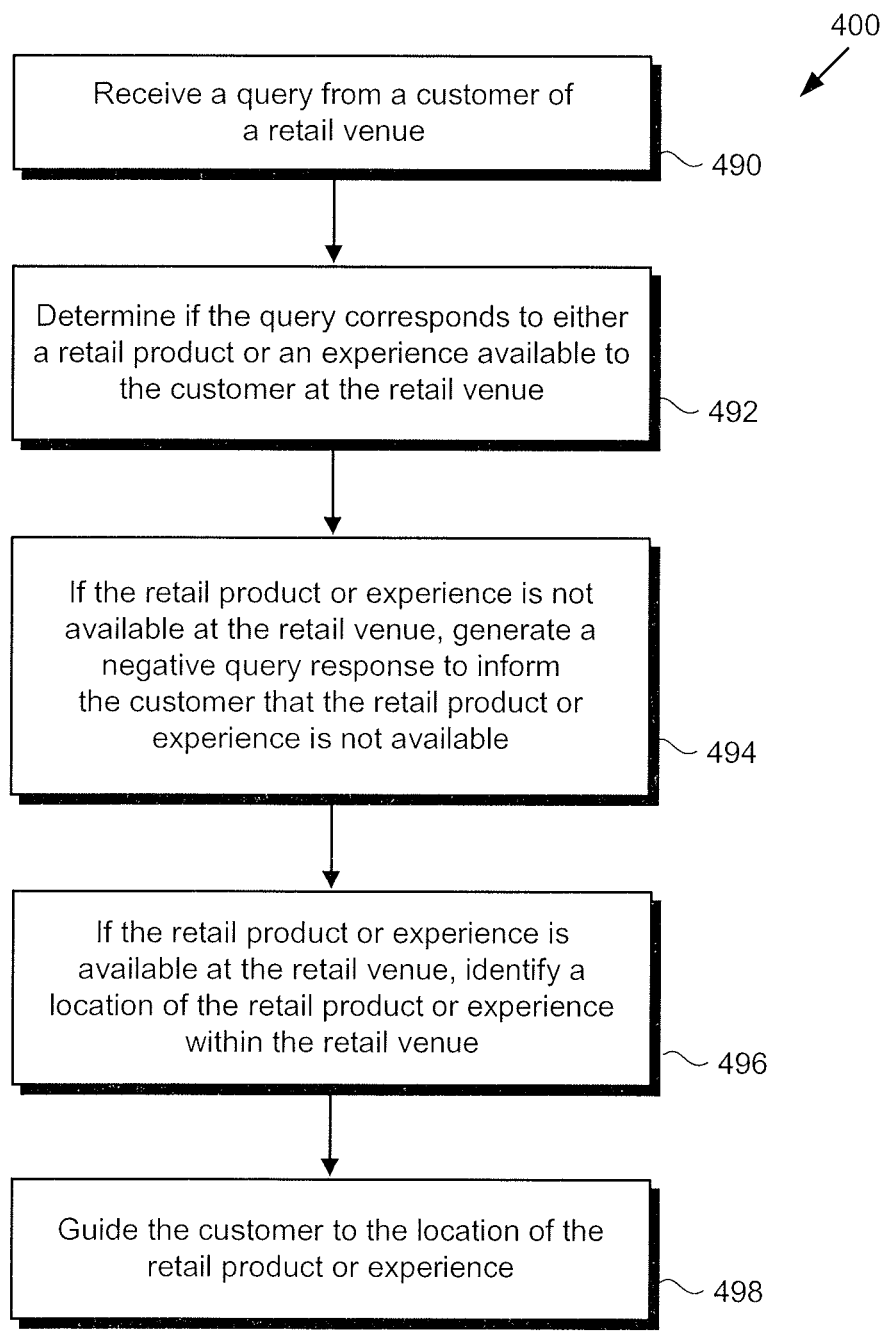
FIG. 4 shows a flowchart presenting an exemplary method for use by a system including a retail venue providing automated customer assistance, according to one implementation.

The functionality of system 100 including retail venue 140/340 will be further described by reference to FIG. 4 in combination with FIGS. 1, 2, and 3. FIG. 4 shows flowchart 400 presenting an exemplary method for use by a system including a retail venue providing automated customer assistance, according to one implementation. With respect to the method outlined in FIG. 4, it is noted that certain details and features have been left out of flowchart 400 in order not to obscure the discussion of the inventive features in the present application.

Referring to FIG. 4 in combination with FIGS. 1, 2, and 3, flowchart 400 begins with receiving query 246 from customer 120/320 of retail venue 140/340 (action 490).

Query 246 may be in regard to a retail product, or an experience, such as an activity or entertainment, sought by customer 120/320 at retail venue 140/340. In one implementation, for example, retail venue 140/340 may be a large physical space including an extensive inventory of retail products 370. Customer 120/320 may enter retail venue 140/340 seeking a particular retail product or experience, but may be uncertain as to where within retail venue 140/340 the retail product or experience can be found. Rather than seeking out a customer service representative for in-person assistance, customer 120/320 may trigger system 100 to provide automated customer assistance by issuing query 246.

Query 246 may be received by system 100 in various ways. For example, in some implementations, computing platform 150 of retail venue 140/340 may be interactively linked to microphone array 146/346 of retail venue 140/340. In those implementations, query 246 may be received as a voice input to microphone array 146/346 produced by spoken query 246 by customer 120/320. Such a spoken query may be received from customer 120/320 via microphone array 146/346 by venue inventory and activity guide software code 160/260, executed by hardware processor 152 of computing platform 150, and using venue management module 262.

Alternatively, in some implementations, query 246 received from customer 120/320 may be included in customer data 124/224, and may be submitted by customer 120/320 through user application 116/316 executed by mobile communication device 122/322 possessed by customer 120/320. In those implementations, query 246 included in customer data 124/224 may be received from customer 120/320 by venue inventory and activity guide software code 160/260, executed by hardware processor 152 of computing platform 150, via user application 116/316, communication network 126, and venue coordination server 102.

Flowchart 400 continues with determining if query 246 corresponds to either a retail product or an experience available to customer 120/320 at retail venue 140/340 (action 492). In some cases, customer 120/320 may be a new customer of retail venue 140/340, or may be otherwise unaware of retail products and/or experiences available at retail venue 140/340. In those cases, query 246 may or may not correspond to a retail product or an experience available to customer 120/320 at retail venue 140/340. Determination of whether query 246 corresponds to a retail product or an experience available to customer 120/320 at retail venue 140/340 may be performed by venue inventory and activity guide software code 160/260, executed by hardware processor 152 of computing platform 150, and using venue management module 262 and one or both of local activity schedule 268 and product location module 270.

In use cases in which the retail product or experience serving as the subject of query 246 is not available at retail venue 140/340, flowchart 400 continues with generating a negative query response (action 494). The negative query response can by generated in several different ways. For example, in some implementations, computing platform 150 of retail venue 140/340 may be interactively linked to customer guidance system 144 including speakers 374. In those implementations, the negative query response may be an audio response delivered via speakers 374, such as a voice message stating that the sought after product or experience is not available at retail venue 140/340. Such a negative query response may be generated via speakers 374 by venue inventory and activity guide software code 160/260, executed by hardware processor 152 of computing platform 150, and using venue management module 262.

Alternatively, in some implementations, the negative query response may be included in customer data 124/224, and may be communicated to customer 120/320 through mobile communication device 122/322 possessed by customer 120/320. For example, in some implementations, the negative query response may be generated as a text message or email message sent to customer 120/320. However, in some implementations, the negative query response may be generated via user application 116/316 executed by mobile communication device 122/322. In implementations in which the negative query response is communicated to customer 120/320 through mobile communication device 122/322, the negative query response included in customer data 124/224 may be generated by venue inventory and activity guide software code 160/260, executed by hardware processor 152 of computing platform 150, and may be sent via user application 116/316, communication network 126, and venue coordination server 102.

In use cases in which retail product 370 or the experience serving as the subject of query 246 is available at retail venue 140/340, flowchart 400 continues with identifying the location of retail product 370 or the experience within retail venue 140/340 (action 496). Identification of the location of retail produce 370 or the queried experience within retail venue 140/340 may be performed by venue inventory and activity guide software code 160/260, executed by hardware processor 152 of computing platform 150, and using venue management module 262 and one or both of local activity schedule 268 and product location module 270.

As noted above, in implementations in which the subject of query 246 received from customer 120/320 is an experience available at retail venue 140/340, that experience may be an entertainment, such as a multi-media entertainment, presented using entertainment system 148 including display screen 356. Display screen 356 may be a large, wall mounted or wall inset display screen, for example. In some implementations, for instance, display screen 356 may occupy substantially all of wall 384b of retail venue 140/340. Display screen 356 may take the form of a liquid crystal display (LCD), a light-emitting diode (LED) display, an organic light-emitting diode (OLED) display, or another suitable display screen that performs a physical transformation of signals to light.

In addition to display screen 356, entertainment system 148 may also include audio system 358. Audio system 358 may be a venue wide audio system, such as a theater quality Dolby® high definition (HD) surround-sound system, for example. Moreover, in some implementations, audio system 358 may be synchronized with display screen 356 to produce an immersive multi-media environment within retail venue 140/340.

In implementations in which retail products 370 are movie themed retail products, for example, the multi-media entertainment provided using entertainment system 148 may relate to the movie corresponding to retail products 370. For instance, the multi-media entertainment may include showing images from the corresponding movie on display screen 356, and/or playing a portion or portions of the movie soundtrack using audio system 358. Alternatively, or in addition, in implementations in which retail venue 140/340 is affiliated with an entertainment venue located outside of retail venue 140/340, such as a theme park, the multi-media entertainment may take the form of coverage of live entertainment activities, such as parades, concerts, or demonstrations, taking place at the affiliate entertainment venue.

Such a multi-media entertainment may be presented by venue inventory and activity guide software code 160/260, executed by hardware processor 152, and using venue management module 262 in combination with venue entertainment module 266 and entertainment system 148. That is to say, venue inventory and activity guide software code 160/260 may utilize venue management module 262 to send entertainment initiation data 276 to venue entertainment module 266, which, in turn, causes venue entertainment module 266 to output entertainment data 248 to entertainment system 148.

In some implementations, Flowchart 400 can conclude with guiding customer 120/320 to the location of retail product 370 or the experience sought in query 246 (action 498). As noted above, in some implementations, computing platform 150 is interactively linked to customer guidance system 144 including audio speakers 374. In those implementations, customer 120/320 may be guided to the location of retail produce 370, for example, using sound generated by one or more of audio speakers 374. Alternatively, or in addition, in some implementations, computing platform 150 is interactively linked to customer guidance system 144 including navigation lights 376. In those implementations, customer 120/320 may be guided to the location of retail produce 370, for example, using one or more of navigation lights 376.

In addition to, or alternatively to, the use of audio speakers 374 and/or navigation lights 376, customer 120/320 may be guided using other features of retail venue 140/340. For example, in some implementations, customer 120/320 may be guided to retail product 370 or a particular experience using sequential messages displayed on flat panel displays distributed throughout retail venue, or by directions or symbols, such as comical mechanical arrows, projected on floor space 382 of retail venue.

Customer 120/320 may be guided to the location of retail product 370 or the experience by venue inventory and activity guide software code 160/260, executed by hardware processor 152, and using venue management module 262 in combination with local activity schedule 268 and/or product location module 270. In other words, venue inventory and activity guide software code 160/260 may utilize local activity data 278 and/or product location data 272 to generate customer guidance data 244 as an output provided to customer guidance system 144.

Moreover, in some implementations, guiding customer 120/320 to the location of retail product 370 or the experience may include determining the present location of customer 120/320 within retail venue 140/340. Determining the present location of customer 120/320 within retail venue 140/340 advantageously enables providing guidance to customer 120/320 that is specific and relevant to that location. Determination of the present location of customer 120/320 within retail venue 140/340 may be performed in any of a number of ways.

For example, if customer 120/320 makes a verbal query as to whether retail product 370 or a particular experience is available at retail venue 140/340 via one of the microphones included in microphone array 146/346, venue inventory and activity guide software code 160/260 may be executed by hardware processor 152 to determine the present location of customer 120/320 based on the particular microphone through which the query is received. In that implementation, venue inventory and activity guide software code 160/260 may be further executed by hardware processor 152 to direct customer guidance system 144 to activate one or more of audio speakers 374 close to customer 120/320. Alternatively, or in addition, guidance may be provided to customer 120/320 on a display that is close to customer 120/320, or through the use of any other signaling device located close to customer 120/320.

As another example, camera system 142/342 of retail venue 140/340 may be used to determine the present location of customer 120/320 within retail venue 140/340. Camera system 142/342 may include one or more still cameras, such as single shot cameras, and/or one or more video cameras. Those cameras may be distributed throughout retail venue 140/340 so as to enable viewing of different parts of retail venue 140/340 concurrently. Camera system 142/342 may be coordinated by venue inventory and activity guide software code 160/260 to substantially continuously track customer 120/320 as customer 120/320 moves between the viewpoints of the cameras, thereby enabling determination of the present location of customer 120/320. Guiding customer 120/320 under those circumstances may take the form of providing "turn-by-turn" directions to retail product 370 or the particular experience queried by customer 120/320.

It is noted that, in addition to, or alternatively to, determining the present location of customer 120/320 within retail venue 140/340 through the use of camera system 142/342, or by proximity to a particular microphone of microphone array 146/346, such a determination may be made using any number of localization techniques. For instance, determining the present location of customer 120/320 may be performed by tracking signals produced by mobile communication device 122/322 possessed by customer 120/320. Alternatively, determining the present location of customer 120/320 may be performed by tracking a wearable item, such as a QR code hat, or a Magic Band or an "amulet" equipped with a radio-frequency (RF) transmitter, infrared (IR) transmitter, ultrasonic emitter, or the like, given to or purchased by customer 120/320.

In some implementations, customer 120/320 may be guided to the location of retail product 370 or the experience sought in query 246 using AR guidance 378 generated by user application 116/316 and display 372 of mobile device 122/322. Display 372 of mobile device 122/322 may take the form of an LCD, an LED display, an OLED display, or another suitable display that performs a physical transformation of signals to light.

In implementations in which customer 120/320 is guided to the location of retail product 370 or the experience using AR guidance 378 generated by user application 116/316 and display 372 of mobile device 122/322, such guidance may be provided by venue inventory and activity guide software code 160/260, executed by hardware processor 152 of computing platform 150, and may be sent to user application 116/316 via communication network 126 and venue coordination server 102.

As noted above, according to some implementations, computing platform 150 may be interactively linked to camera system 142/342 of retail venue 140/340. Camera system 142/342 may be configured to generate camera data 242 of customer 120/320. As shown in FIG. 3, camera system 142/342 may be mounted on wall 384a of retail venue 140/340, and may be configured to capture camera data 242 of customer 120/320 as customer 120/320 enters retail venue 140/340, or while customer 120/320 browses or shops in retail venue 140/340. As further noted above, camera system 142/342 may include one or more still cameras, such as single shot cameras, and/or one or more video cameras.

In those implementations, the method outlined by flowchart 400, in FIG. 4, may further include generating an image corresponding to customer 120/320 based on camera data 242, determining the gender of customer 120/320 based on the image, and estimating the age and/or a physical dimension of customer 120/320 based on the image. The method can also include storing the gender and the estimated age and/or the estimated physical dimension of customer 120/320 in customer database 112 for use in generating a product recommendation for customer 120/320. The method would also obtain all the proper consents from the customer 120/320 prior to engaging in this process.

The image corresponding to customer 120/320 may be generated by venue inventory and activity guide software code 160/260, executed by hardware processor 152 of computing platform 150, and using image generation module 264. For example, in some implementations, image generation module 264 may generate avatar 274 of customer 120/320 based on camera data 242. In those implementations, avatar 274 may be transferred to venue management module 262 and may be utilized to identify the gender and estimate the age and/or the physical dimension of customer 120/320.

In some implementations, user 130 may utilize remote computing device 132 to access venue coordination server 102 in order to query the availability and or location of a retail product or experience of interest to user 130. In those implementations, server processor 104 may be configured to execute all venue inventory and activity guide software code 110 to receive a query from user 130, via user application 116/316 executed by remote computing device 132, and to determine if the query corresponds to a retail product or an experience available at one or more of multiple affiliate retail venues including retail venue 140/340.

If the retail product or the experience queried by user 130 is not available at any of the affiliate retail venues, server processor 104 may execute all venue inventory and activity guide software code 110 to generate a negative query response. For example, in some implementations, the negative query response may be generated as a text message or email message sent to user 130. However, in some implementations, the negative query response may be generated via user application 116/316 executed by remote computing device 132.

Conversely, if the retail product or the experience queried by user 130 is available at one or more of the affiliate retail venues, server processor 104 may execute all venue inventory and activity guide software code 110 to identify those affiliate retail venue or venues. Identifying the one or more affiliate retail venues at which the retail product or experience is available may include providing a geographical address of each affiliate retail venue, such as respective street addresses or Global Positioning System (GPS) coordinates, for example. Alternatively, or in addition, identifying the one or more affiliate retail venues at which the retail product or experience is available may include providing a Universal Resource Identifier (URI) for each affiliate retail venue, such as a respective Universal Resource Locator (URL) on communication network 126.

It is noted that, in some implementations, the method outlined in flowchart 400 may include an analogous product or experience location service across all affiliate retail venues when the product or experience queried by customer 120/320 in action 490 is not available at retail venue 140/340. In those implementations, hardware processor 152 of computing platform 150 may execute venue inventory and activity guide software code 160/260 to transmit query 246 to venue coordination server 102 via communication network 126 and network communication links 128/228.

As a result, and in addition to the negative query response generated by system 100 in action 494, server processor 104 of venue coordination server 102 may execute all venue inventory and activity guide software code 110 to determine if the query corresponds to a retail product or an experience available at any of the multiple affiliate retail venues including retail venue 140/340. If the retail product or the experience queried by user 130 is available at an affiliate retail venue other than retail venue 140/340, server processor 104 may execute all venue inventory and activity guide software code 110 to identify the other affiliate retail venue or venues. Identifying the one or more other affiliate retail venues may include providing respective street addresses and/or GPS coordinates and/or respective URIs, such as URLs.

Thus, the present application discloses commercial solutions providing a shopping experience that includes enhancements that cannot be readily replicated in an online environment. The retail venues disclosed in the present application provide immersive and interactive customer environments that blend shopping with entertainment and automated customer assistance. As a result, the present application advantageously discloses brick-and-mortar retail venues delivering enhanced customer experiences sufficiently attractive to motivate potential shoppers to do their browsing and purchasing in-store.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for automating customer assistance, the system comprising:
   a camera system of a retail venue configured to generate a camera data of a customer of the retail venue;
   a computing platform interactively linked to the camera system, the computing platform having a hardware processor and a memory storing a venue inventory and activity guide software code;
   the hardware processor configured to execute the venue inventory and activity guide software code to:
   generate an image corresponding to the customer based on the camera data;
   determine a gender of the customer based on the image;
   estimate an age of the customer based on the image;
   generate at least one product recommendation or experience recommendation for the customer based on the determined gender and the estimated age of the customer;
   receive a query from the customer of the retail venue regarding the availability of a particular product or a particular experience of the at least one product recommendation or experience recommendation;
   determine if the particular product or the particular experience corresponding to the query is available to the customer at the retail venue;

if the particular product or the particular experience corresponding to the query is not available at the retail venue, generate a negative query response, and deliver the negative query response to the customer via at least one of an audio response, a text message, or an email message;

if the particular product or the particular experience corresponding to the query is available at the retail venue, identify a location of the particular product or the particular experience corresponding to the query within the retail venue; and guide the customer to the location.

2. The system of claim 1, wherein, to guide the customer to the location, the hardware processor is further configured to execute the venue inventory and activity guide software code to determine a present location of the customer within the retail venue.

3. The system of claim 1, wherein the computing platform is interactively linked to a microphone array of the retail venue, and wherein the query is received as a voice input produced by the customer.

4. The system of claim 1, wherein the computing platform is interactively linked to a customer guidance system including a plurality of audio speakers, and wherein the hardware processor is configured to execute the venue inventory and activity guide software code to guide the customer to the location using sound generated by at least one of the plurality of audio speakers.

5. The system of claim 1, wherein the computing platform is interactively linked to a customer guidance system including a plurality of navigation lights, and wherein the hardware processor is configured to execute the venue inventory and activity guide software code to guide the customer to the location using at least one of the plurality of navigation lights.

6. The system of claim 1, wherein the computing platform is interactively linked to an entertainment system of the retail venue, and wherein the particular experience available at the retail venue is a multi-media entertainment presented using the entertainment system.

7. The system of claim 1, wherein the image corresponding to the customer comprises an avatar of the customer.

8. The system of claim 1, wherein the computing platform is remotely linked to a venue coordination server in communication with the customer via a user application executed by a mobile device possessed by the customer, and wherein the query is received via the user application and the venue coordination server.

9. The system of claim 8, wherein the hardware processor is configured to execute the venue inventory and activity guide software code to guide the customer to the location using an augmented reality (AR) guidance generated by the user application and a display of the mobile device.

10. A method for use by a system for automating customer assistance, the system including a retail venue having a camera system configured to generate a camera data of a customer of the retail venue, and a computing platform interactively linked to the camera system, the computing platform having a hardware processor and a memory storing a venue inventory and activity guide software code, the method comprising:

generating, using the hardware processor, an image corresponding to the customer based on the camera data;

determining, using the hardware processor, a gender of the customer based on the image;

estimating, using the hardware processor, an age of the customer based on the image;

generating, using the hardware processor, at least one product recommendation or experience recommendation for the customer based on the determined gender and the estimated age of the customer;

receiving, using the hardware processor, a query from the customer of the retail venue regarding the availability of a particular product or a particular experience of the at least one product recommendation or experience recommendation;

determining, using the hardware processor, if the particular product or the particular experience corresponding to the query is to the customer at the retail venue;

if the particular product or the particular experience corresponding to the query is not available at the retail venue, generating, using the hardware processor, a negative query response, and deliver the negative query response to the customer via at least one of an audio response, a text message, or an email message;

if the particular product or the particular experience corresponding to the query is available at the retail venue, identifying, using the hardware processor, a location of the particular product or the particular experience corresponding to the query within the retail venue; and guiding, using the hardware processor, the customer to the location.

11. The method of claim 10, wherein guiding the customer to the location includes determining a present location of the customer within the retail venue.

12. The method of claim 10, wherein the query is received as a voice input produced by the customer.

13. The method of claim 10, wherein the customer is guided to the location using sound.

14. The method of claim 10, wherein the customer is guided to the location using light.

15. The method of claim 10, wherein the computing platform is interactively linked to an entertainment system of the retail venue, and wherein the particular experience available at the retail venue is a multi-media entertainment presented using the entertainment system.

16. The method of claim 10, wherein the image corresponding to the customer comprises an avatar of the customer.

17. The method of claim 10, wherein the computing platform is remotely linked to a venue coordination server in communication with the customer via a user application executed by a mobile device possessed by the customer, and wherein the query is received via the user application and the venue coordination server.

18. The method of claim 17, wherein the customer is guided to the location using an augmented reality (AR) guidance generated by the user application and a display of the mobile device.

* * * * *